United States Patent
Yogeeswaran et al.

(10) Patent No.: US 8,624,424 B2
(45) Date of Patent: Jan. 7, 2014

(54) SYSTEMS AND METHODS TO EMULATE HIGH FREQUENCY ELECTRICAL SIGNATURES

(75) Inventors: Karthik Yogeeswaran, Santa Monica, CA (US); Charles Gillen-O'Neel, Los Angeles, CA (US); Jeffery Grab, West Hills, CA (US)

(73) Assignee: Belkin International, Inc., Playa Vista, CA (US)

( * ) Notice: Subject to any disclaimer, the term of this patent is extended or adjusted under 35 U.S.C. 154(b) by 25 days.

(21) Appl. No.: 13/444,531

(22) Filed: Apr. 11, 2012

(65) Prior Publication Data

US 2013/0076119 A1   Mar. 28, 2013

Related U.S. Application Data

(60) Provisional application No. 61/578,638, filed on Dec. 21, 2011, provisional application No. 61/539,427, filed on Sep. 26, 2011.

(51) Int. Cl.
*H02J 3/02*   (2006.01)

(52) U.S. Cl.
USPC ............................................................ 307/3

(58) Field of Classification Search
USPC ............................................................ 307/3
See application file for complete search history.

(56) References Cited

U.S. PATENT DOCUMENTS

| | | | | |
|---|---|---|---|---|
| 4,638,417 | A * | 1/1987 | Martin et al. | 363/41 |
| 8,093,765 | B1 * | 1/2012 | Beard | 307/407 |
| 8,094,034 | B2 * | 1/2012 | Patel et al. | 340/657 |
| 8,334,784 | B2 * | 12/2012 | Patel et al. | 340/657 |
| 2006/0220833 | A1 | 10/2006 | Berkman | |
| 2006/0226958 | A1 | 10/2006 | Baril et al. | |
| 2010/0219808 | A1 | 9/2010 | Steckley et al. | |
| 2010/0264731 | A1 | 10/2010 | Arimilli et al. | |
| 2011/0112780 | A1 * | 5/2011 | Moss | 702/62 |
| 2012/0072389 | A1 * | 3/2012 | Aldridge et al. | 706/54 |
| 2012/0092142 | A1 * | 4/2012 | Patel et al. | 340/12.32 |

* cited by examiner

*Primary Examiner* — Adi Amrany
(74) *Attorney, Agent, or Firm* — Bryan Cave LLP

(57) ABSTRACT

Some embodiments teach an electrical device configured to emulate a high frequency electrical noise signal on an electrical power line. The electrical device can include: (a) a monitoring module configured to detect usage of electrical power from an electrical power line by a first one of one or more electrical appliances; (b) an emitter module configured to generate an emulated high frequency electrical noise signal, the emulated high frequency electrical noise signal emulates electrical noise from a switch mode power supply; (c) a first electrical coupling mechanism configured to couple to a first one of the one or more electrical outlets; and (d) a second coupling mechanism configured to couple to the first one of the one or more electrical appliances. Other embodiments are disclosed.

20 Claims, 13 Drawing Sheets

SYSTEMS AND METHODS TO EMULATE HIGH FREQUENCY ELECTRICAL SIGNATURES

CROSS-REFERENCE TO RELATED APPLICATIONS

This application claims the benefit of U.S. Provisional Application No. 61/539,427, filed Sep. 26, 2011, and U.S. Provisional Application No. 61/578,638, filed Dec. 21, 2011. U.S. Provisional Application Nos. 61/539,427 and 61/578,638 are incorporated herein by reference.

FIELD OF THE INVENTION

This invention relates generally to electrical devices, and relates more particularly to systems and methods to emulate high frequency electrical signatures.

DESCRIPTION OF THE BACKGROUND

Many current approaches for detecting and classifying electrical appliance activation use a distributed model wherein each electrical device has a dedicated sensor, which looks for changes in the device's state (e.g., the turning-on and turning-off of the device). Device level sensing is conceptually straightforward, but requires time-consuming and expensive installation and maintenance. Indirect sensing techniques have also been used where microphones, accelerometers, and video cameras are placed throughout a structure to detect electrical appliance activity. Such techniques are effective, but require costly installation and maintenance and may also raise privacy concerns in a home setting. For example, one technique for electrical event detection involves indirectly listening to the activation of switches and motors through microphones distributed throughout a living space.

Accordingly, a need or potential for benefit exists for an apparatus or method that can provide detailed information about the electrical state of electrical devices in a home or other structure but also is relatively inexpensive to deploy and does not require professional installation.

BRIEF DESCRIPTION OF THE DRAWINGS

To facilitate further description of the embodiments, the following drawings are provided in which.

Figure 1:
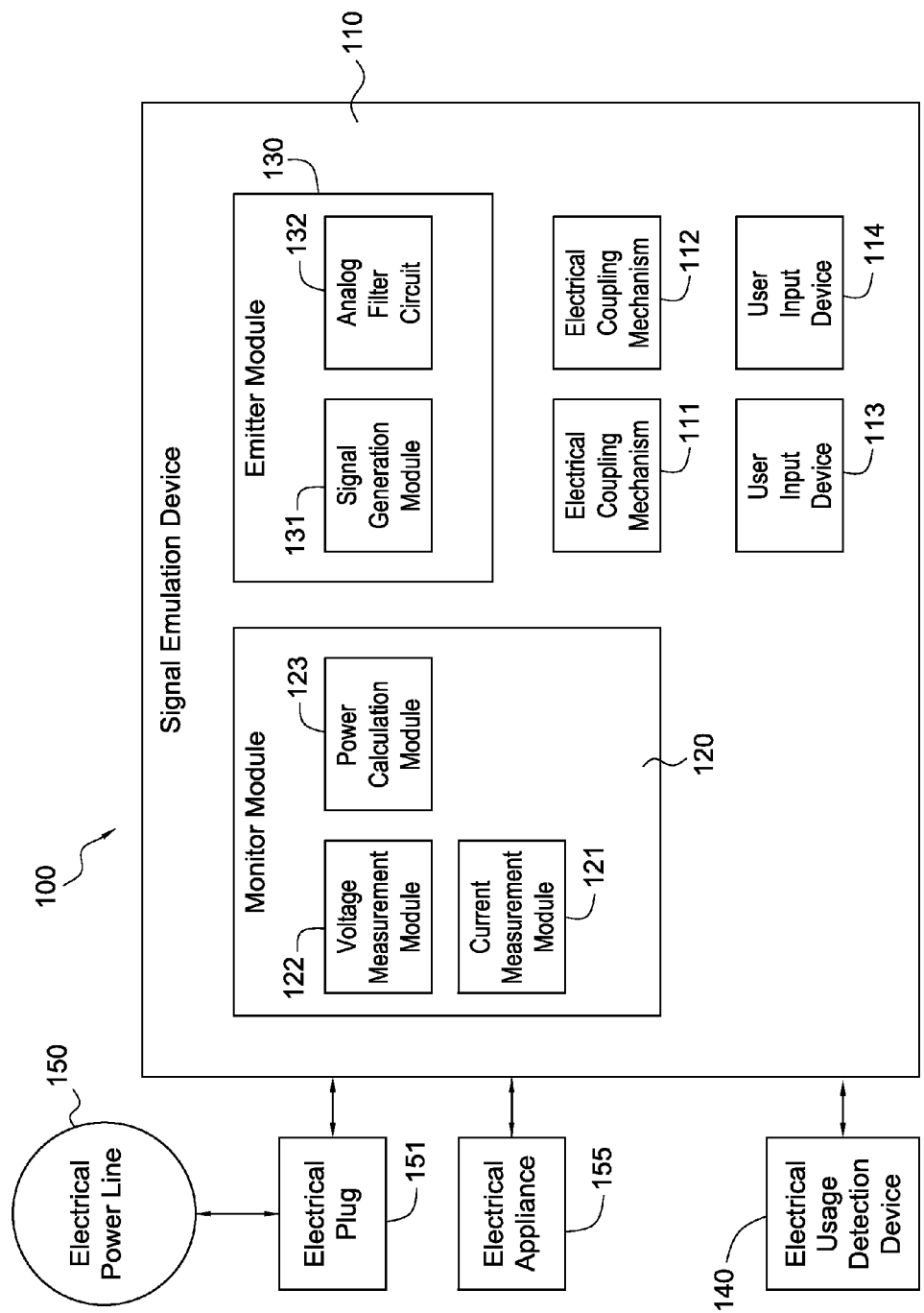
FIG. 1 illustrates a block diagram of a signal emulation system, according to a first embodiment.
Figure 2:
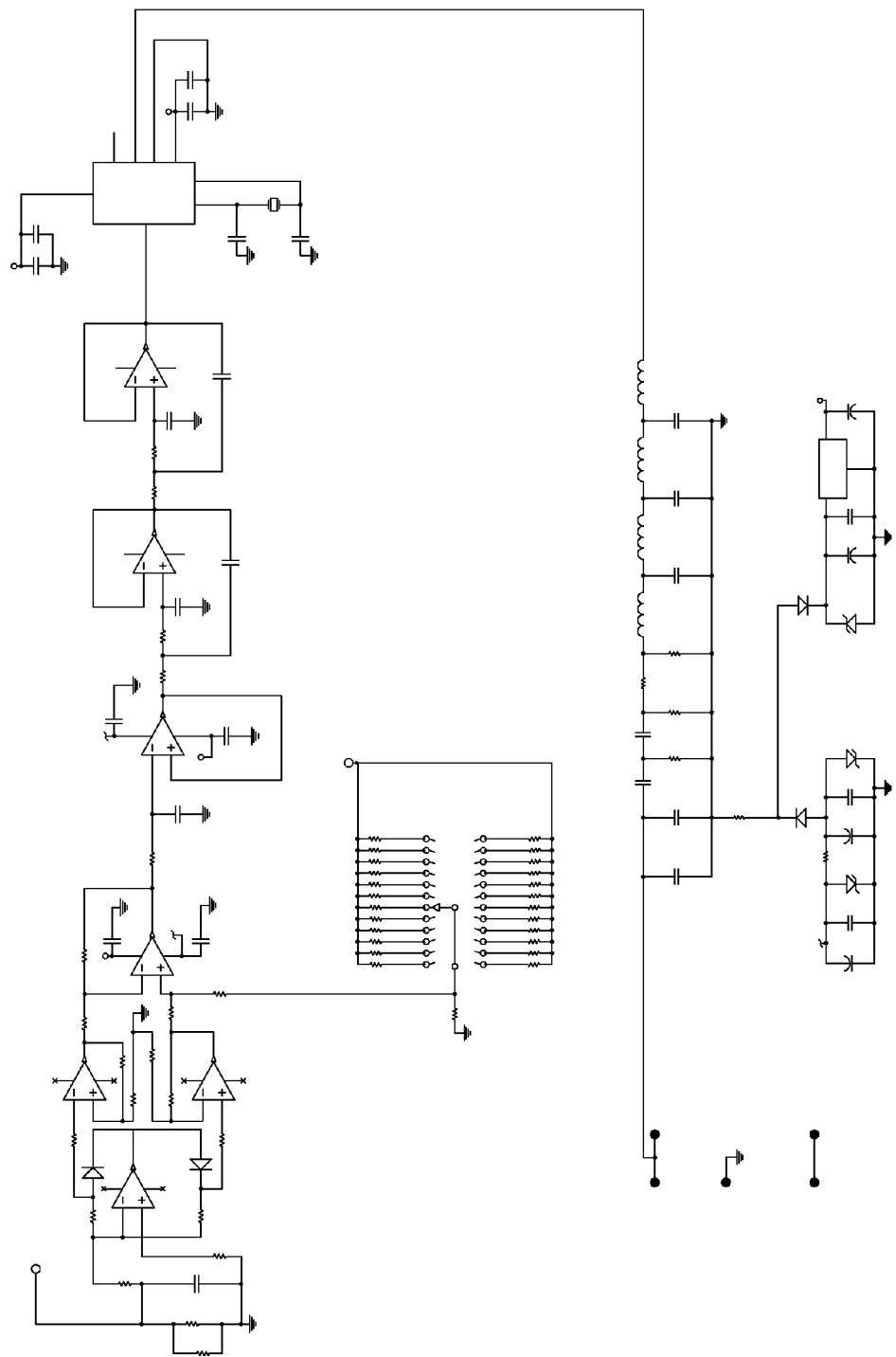
FIGS. 2-7 are exemplary schematics for an analog hybrid embodiment of the signal emulation device of FIG. 1.
Figure 3:
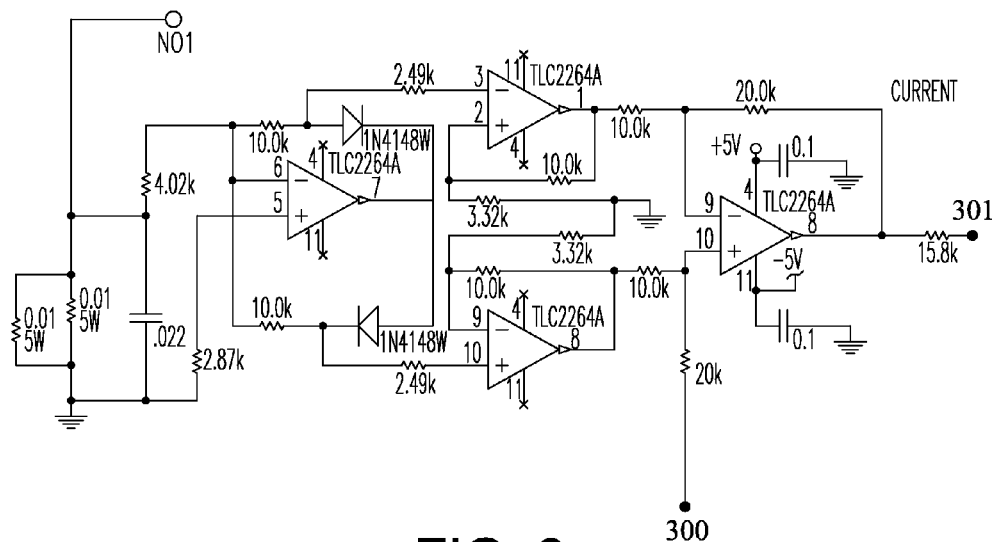
Figure 4:
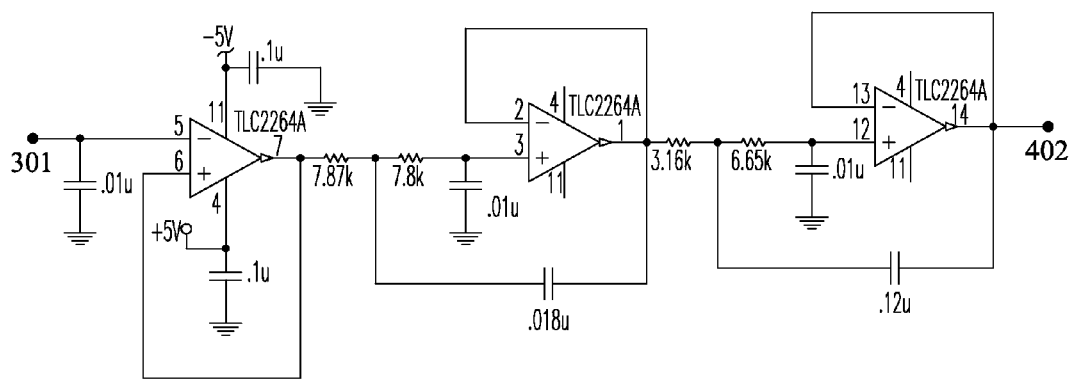
Figure 5:
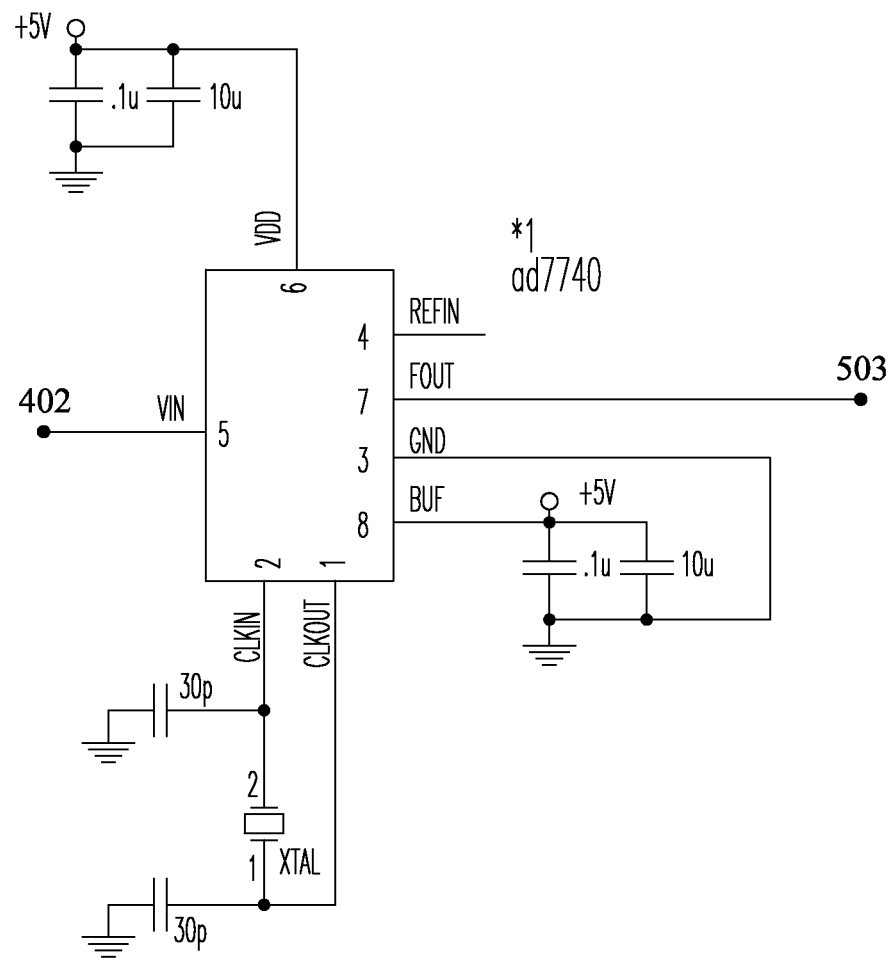
Figure 6:
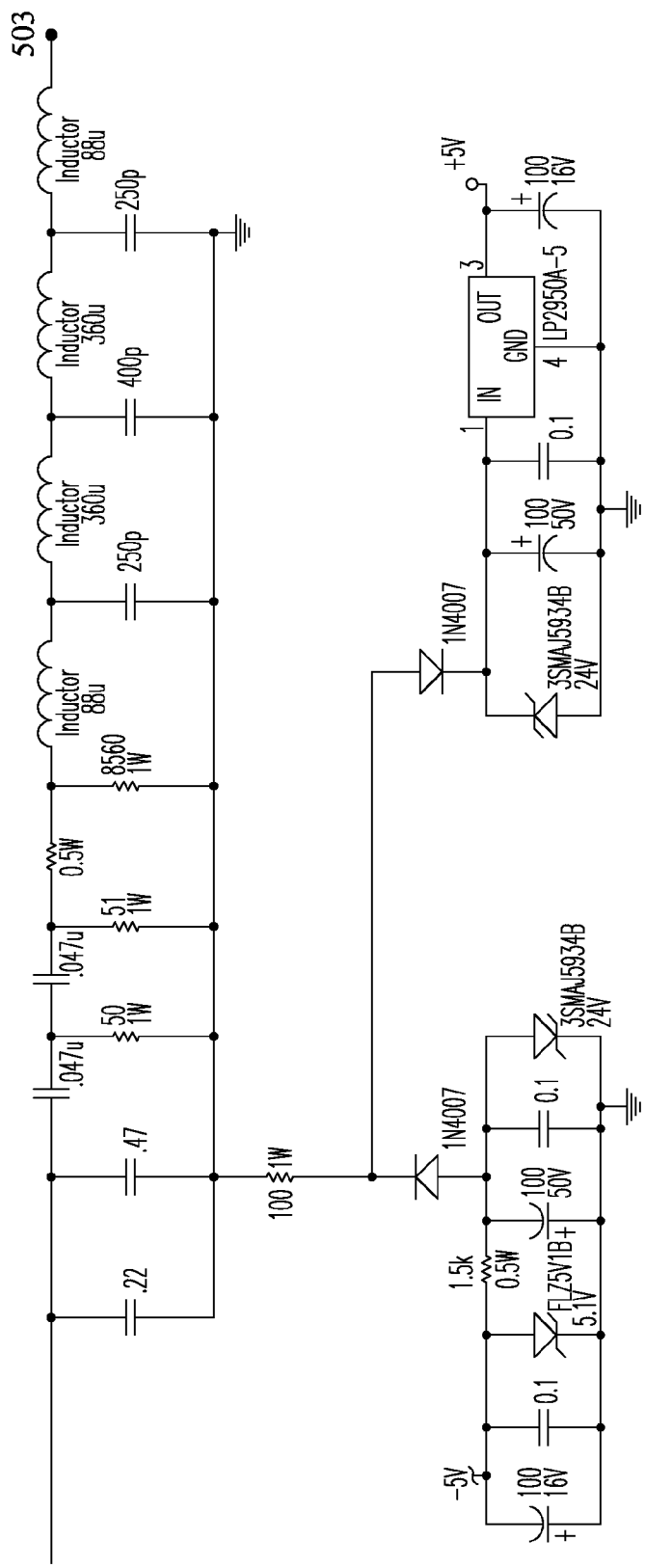
Figure 7:
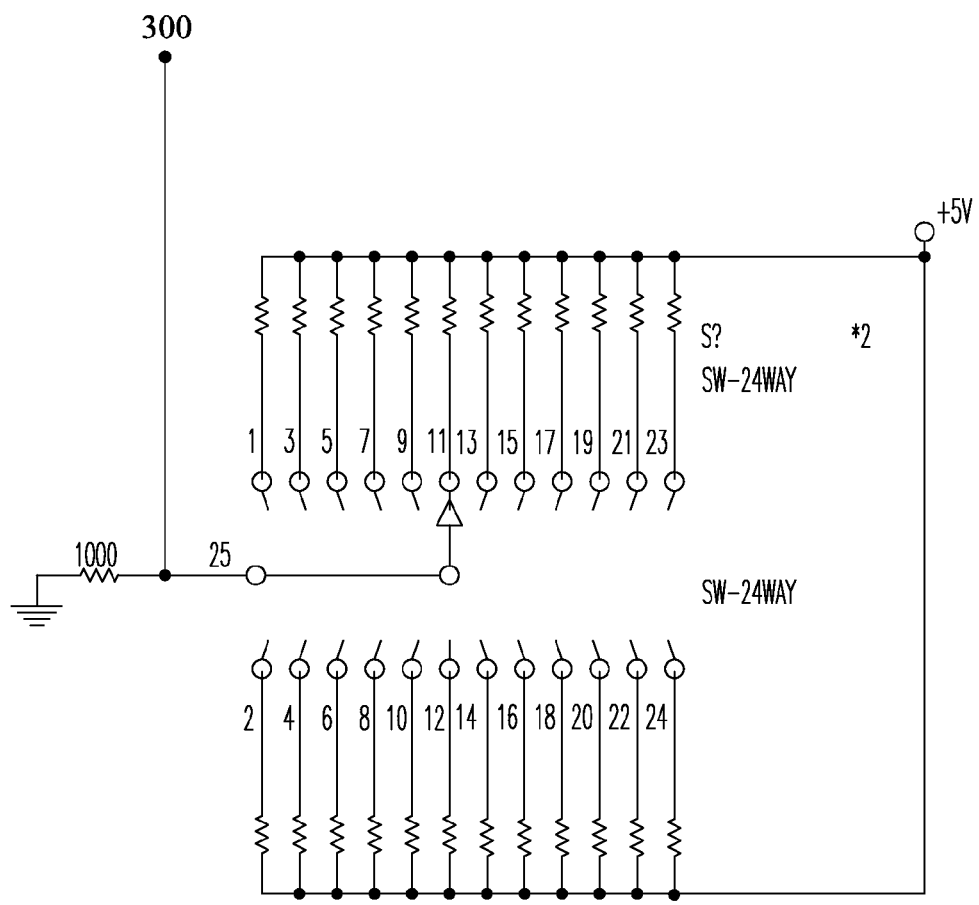
Figure 8:
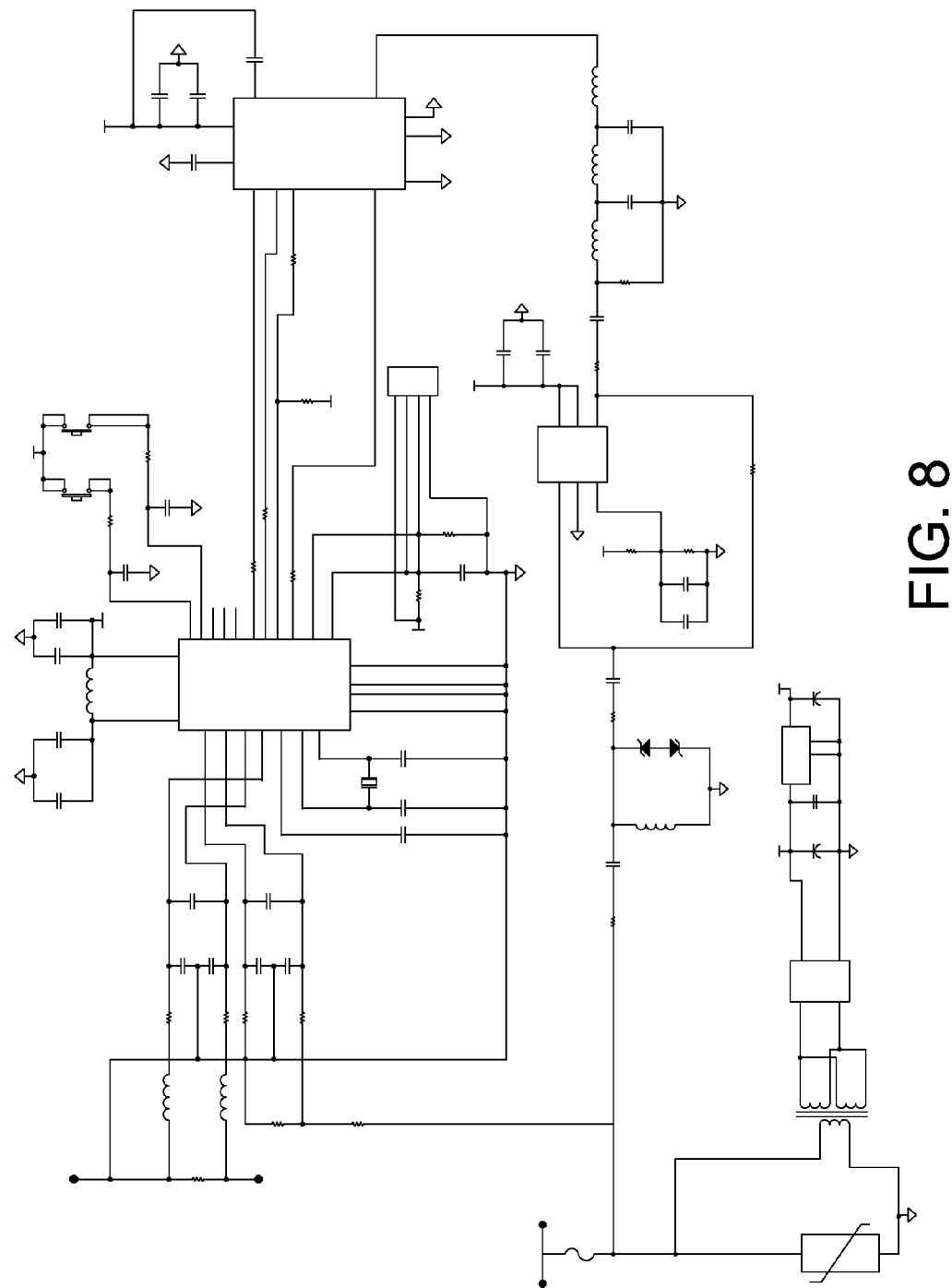
FIGS. 8-13 are exemplary schematics for an embodiment of the signal emulation device of FIG. 1 using an microcontroller.
Figure 9:
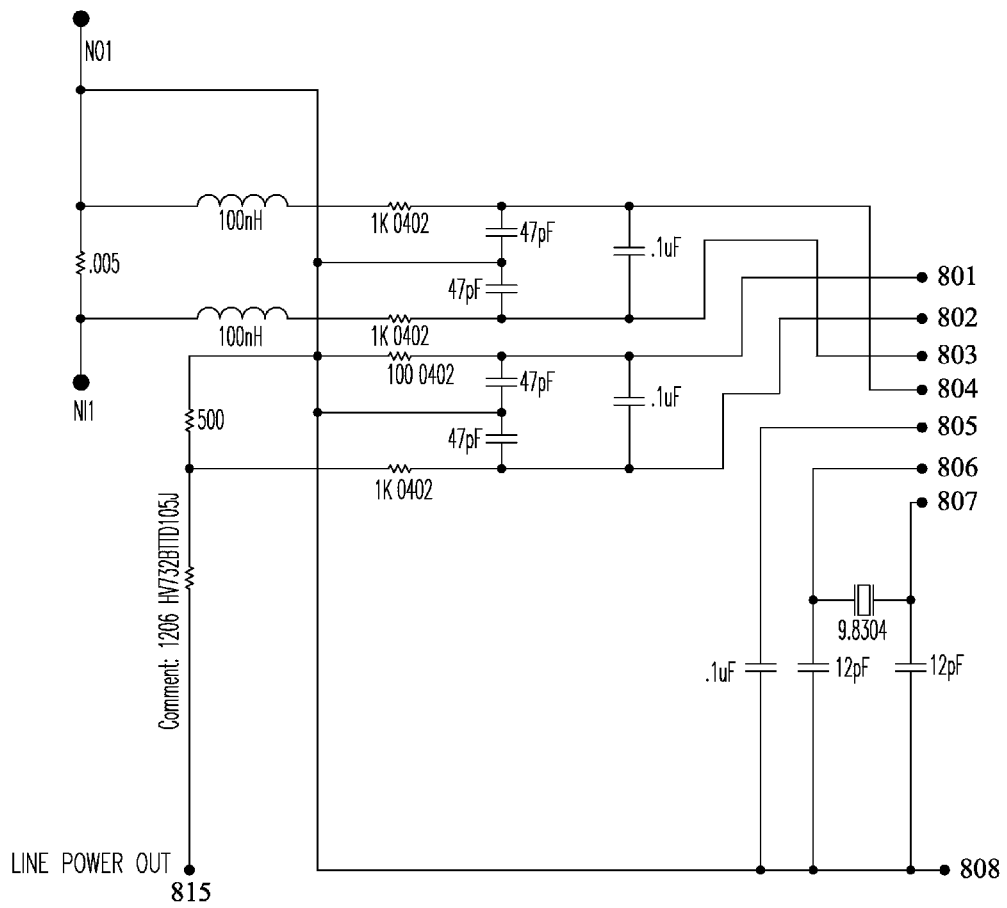
Figure 10:
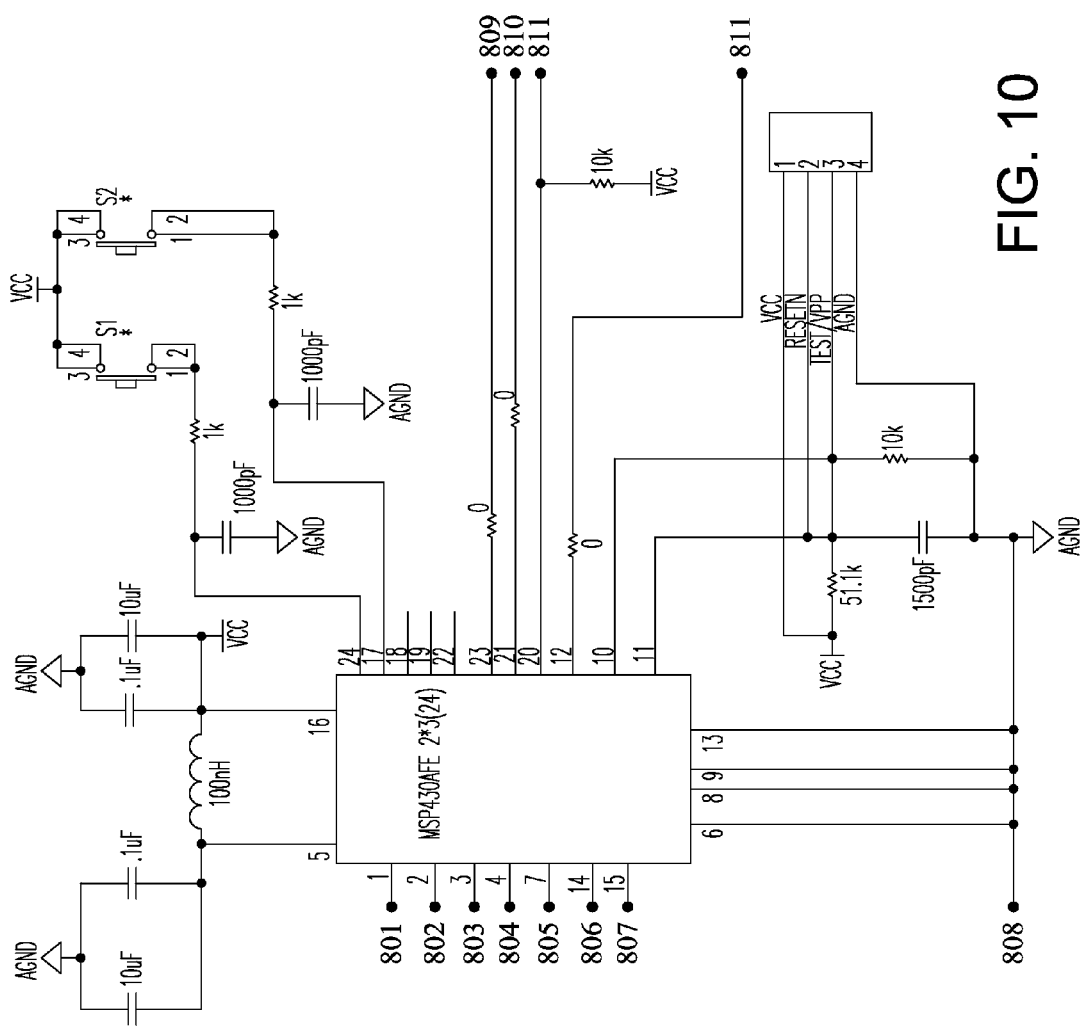
Figure 11:
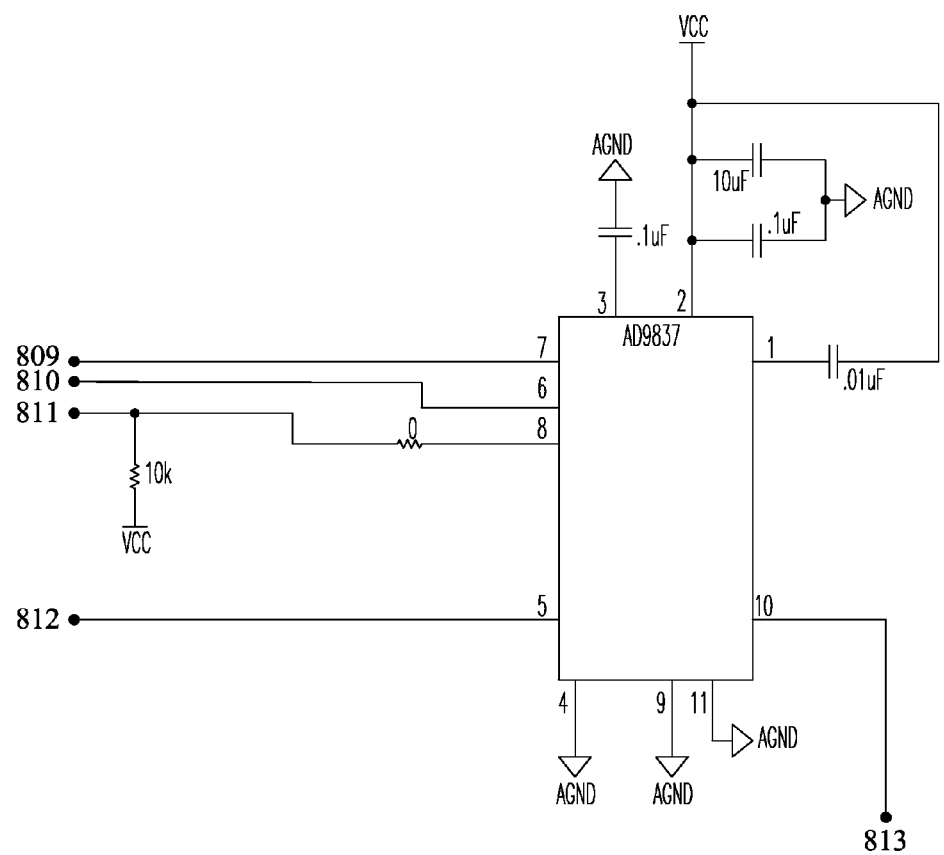
Figure 12:
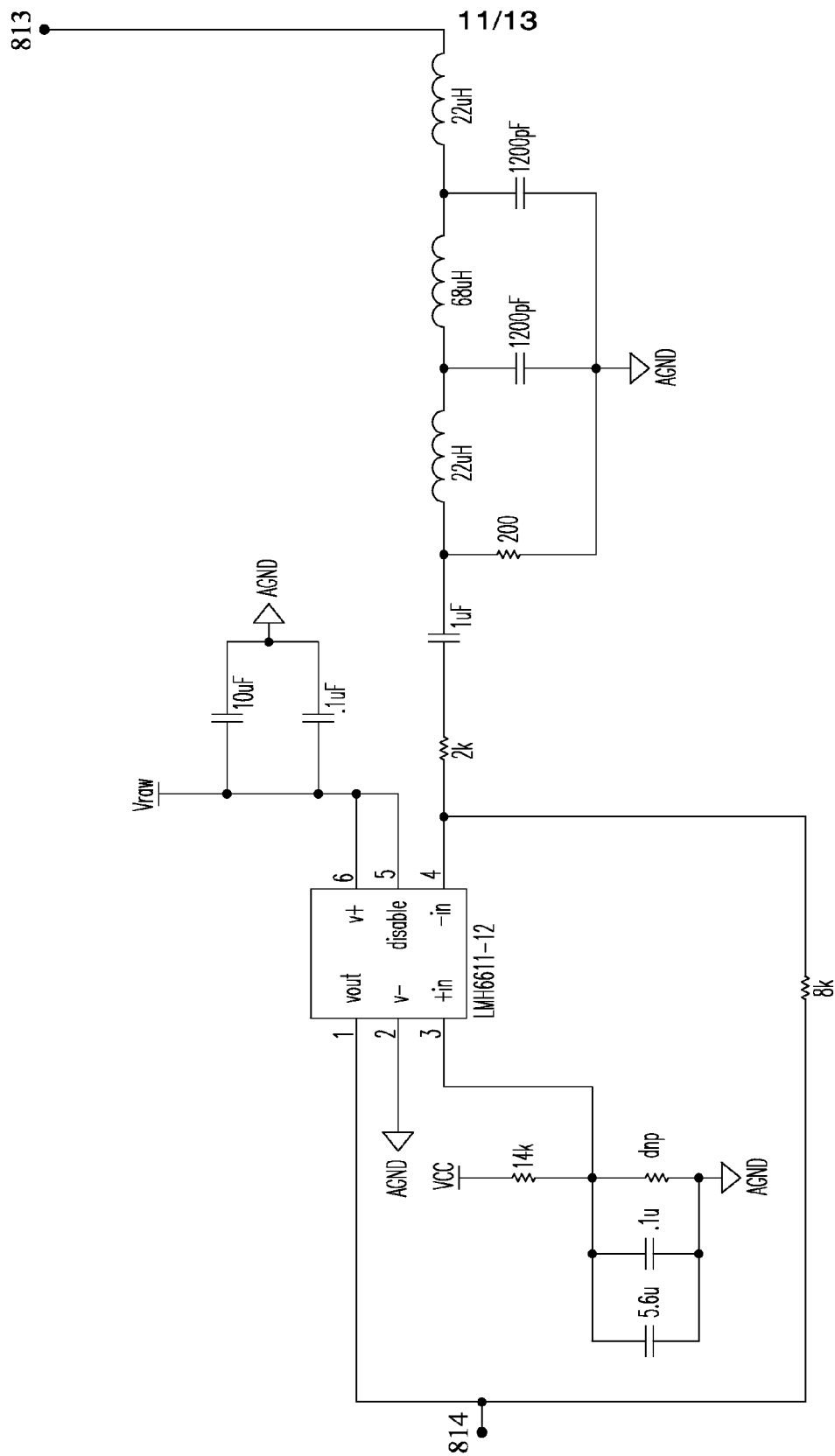
Figure 13:
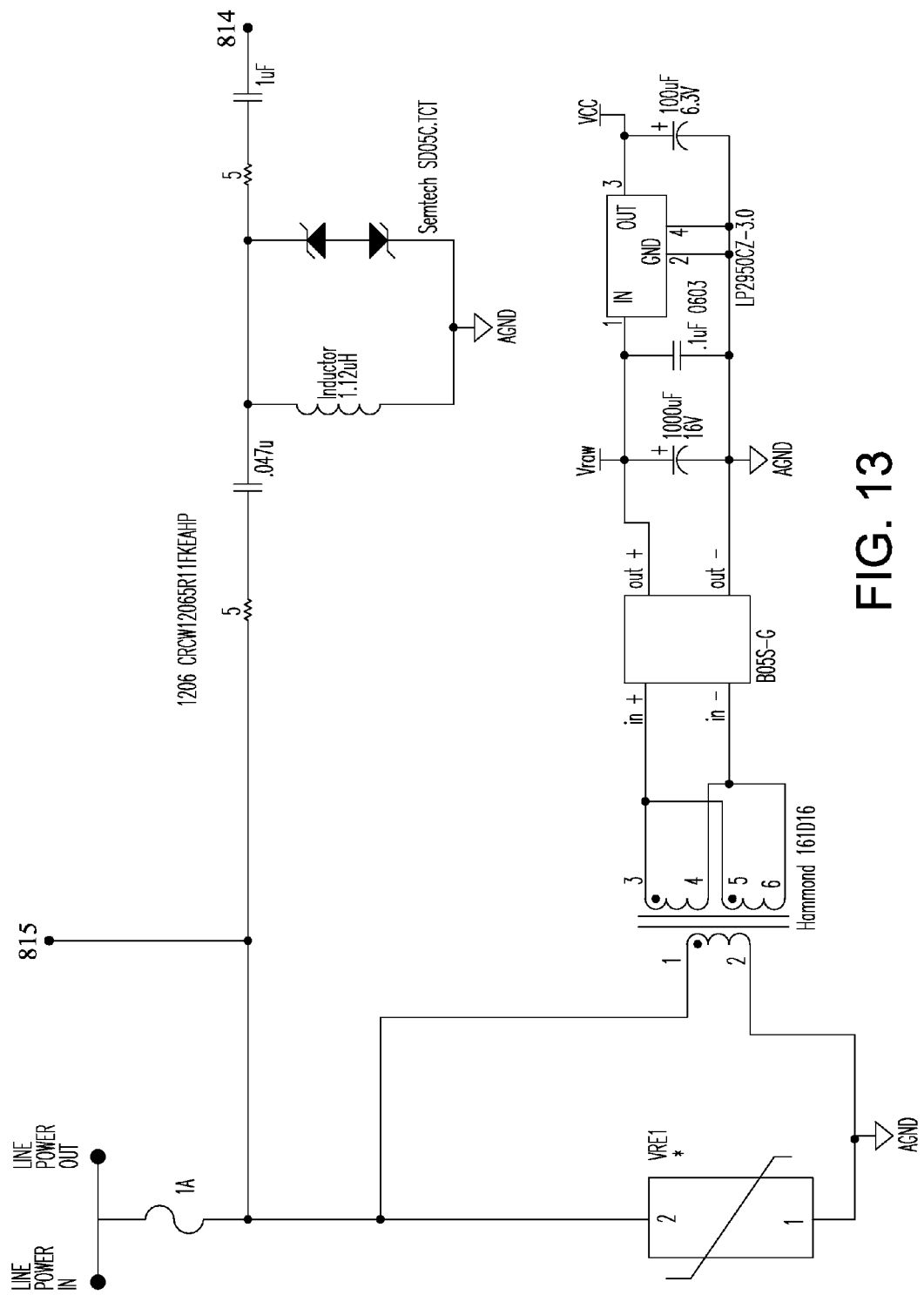

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements may be electrically coupled but not be mechanically or otherwise coupled; two or more mechanical elements may be mechanically coupled, but not be electrically or otherwise coupled; two or more electrical elements may be mechanically coupled, but not be electrically or otherwise coupled. Coupling may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types.

The absence of the word "removably," "removable," and the like near the word "coupled," and the like does not mean that the coupling, etc. in question is or is not removable.

DETAILED DESCRIPTION OF EXAMPLES OF EMBODIMENTS

Some embodiments teach an electrical device configured to emulate a high frequency electrical noise signal on an electrical power line. The electrical power line is coupled to one or more electrical outlets and the electrical device configured to be coupled to one or more electrical appliances. The electrical device can include: (a) a monitoring module configured to detect usage of electrical power from the electrical power line by a first one of the one or more electrical appliances; (b) an emitter module configured to generate an emulated noise, the emulated high frequency electrical noise signal emulates electrical noise from a switch mode power supply; (c) a first electrical coupling mechanism configured to couple to a first one of the one or more electrical outlets; and (d) a second coupling mechanism configured to couple to the first one of the one or more electrical appliances. The emitter module is further configured to generate the emulated high frequency electrical noise signal when the monitoring module detects the usage of the electrical power by the first one of the one or more electrical appliances. The emitter module is further configured to provide the emulated high frequency electrical noise signal to the first electrical coupling mechanism. The first electrical coupling mechanism is further configured to place the emulated high frequency electrical noise signal on the electrical power line. The first coupling mechanism is configured to receive the electrical power from the first one of the one or more electrical outlets and the second coupling mechanism is configured to provide the electrical power to the first one of the one or more electrical appliances.

Further embodiments teach a method to emulate a high frequency electrical signature using a first electrical device. The first electrical device coupled to an electrical power line and a first electrical appliance. The method can include: receiving electrical power from the electrical power line at a first electrical coupling mechanism, the electrical power received from the electrical power line corresponding to an amount of electrical power being used by the first electrical appliance; monitoring usage of the electrical power from the electrical power line by the first electrical appliance; generating an emulated high frequency electrical noise signal, the emulated high frequency electrical noise signal emulates electrical noise from a switch mode power supply; and emitting the emulated high frequency electrical noise signal on to the electrical power line.

Still further embodiments teach a system configured to measure electrical power used by one or more electrical appliances coupled to an electrical power line. The electrical power line is coupled to one or more electrical outlets. The system can include: (a) a first electrical device configured to emulate a high frequency electrical noise signal on an electrical power line, the electrical device configured to couple to one or more electrical appliances, the electrical device can have: (1) a monitoring module configured to detect usage of electrical power from the electrical power line by a first one of the one or more electrical appliances; (2) an emitter module configured to generate an emulated high frequency electrical noise signal, the emulated high frequency electrical noise signal emulates electrical noise from a switch mode power supply; (3) a first electrical coupling mechanism configured to couple to a first one of the one or more electrical outlets; and (4) a second coupling mechanism configured to couple to the first one of the one or more electrical appliances; and (b) an electrical usage detection device configured to monitor general electrical noise transmitted over the electrical power line. The monitor module is further configured to detect an amount of the electrical power used by the first one of the one or more electrical appliances. The emitter module is configured to generate the emulated high frequency electrical noise signal with a frequency dependent upon the amount of the electrical power used by the first one of the one or more electrical appliances. The emitter module is further configured to generate the emulated high frequency electrical noise signal when the monitoring module detects the usage of the electrical power by the first one of the one or more electrical appliances. The emitter module is further configured to provide the emulated high frequency electrical noise signal to the first electrical coupling mechanism. The first electrical coupling mechanism is further configured to place the emulated high frequency electrical noise signal on the electrical power line. The first electrical coupling mechanism is configured to receive the electrical power from the first one of the one or more electrical outlets and the second electrical coupling mechanism is configured to provide the electrical power to the first one of the one or more electrical appliances.

Electrical power on electrical power lines can include electrical noise. The electrical noise present on an electrical power line can be caused by the operation of an electrical device, which is electrically coupled to the electrical power line. This type of electrical noise is called conducted electromagnetic interference (EMI). EMI can be classified into two types: transient noise and continuous noise. In some embodiments, continuous or transient electrical noise that occurs when an electrical device is turned-on is not the same shape of the electrical noise after a few alternating current electrical cycles (e.g., one alternating current electrical cycle is $\frac{1}{60}$th of a second in the United States). For example, the electrical noise of a compact fluorescent light bulb (CFL) has one shape for a few alternating current electrical cycles while the CFL is warming up and then the shape of the electrical noises changes to second shape after the CFL is warmed-up. In another example, DC (direct current) motors have a continuous noise but the continuous noise of the DC motor can only lasts microseconds but can repeat every alternating current electrical cycle while the DC motor is running The electrical event detection device described below can detect all of these types of electrical noise.

Transient noise is characterized by the short duration for which it can be observed, generally tens of nanoseconds to a few milliseconds. Substantially continuous noise, on the other hand, can be observed for as long as the electrical device is operational in some examples. In many embodiments, "continuous noise," as used herein, can mean repetitive, continual, uninterrupted, or repeated noise. In the same or different embodiments, noise can be continuous if a pattern in the noise is repeated every alternating current cycle (or if an electrical noise signal is observed without cessation while the electrical device is operation. Noise can be still considered continuous noise if a one alternating current cycle break occurs in the noise.

In many examples, continuous electrical noise can be identifiable on the electrical power line for a length of time greater than one alternating current electrical cycle. In another example, continuous electrical noise can be identifiable for a length of time that is less than one alternating current cycle but the electrical signals are repeated in three or more alternating current electrical cycles. In another example, continuous electrical noise can be electrical signals that are identifiable on the electrical power line for a length of time greater than approximately ten milliseconds. In another example, continuous electrical noise can be electrical signals that are identifiable on the electrical power line for a length of time greater than approximately fifty milliseconds. In still other examples, continuous electrical noise can be electrical signals that are identifiable on the electrical power line for a length of time greater than approximately one second. In yet further examples, continuous electrical noise can be electrical signals that are identifiable on the electrical power line for a length of time greater than approximately ten seconds.

Both transient and continuous noise can either be concentrated within a narrow frequency band or spread over a wider bandwidth (i.e., broadband noise). A CFL is an example of an electrical device that generates continuous noise, which is conducted over the electrical power line due to its electrical coupling with the electrical power line infrastructure. Because a structure's electrical distribution system is interconnected in parallel at the structure's circuit breaker panel, conducted EMI propagates widely from a given electrical device throughout the electrical line infrastructure of the structure.

Continuous noise is usually intrinsic to an electrical device's operation and internal electronics. Appliances like a grinder emit electrical noise synchronous to the frequency of AC (alternating current) power (60 Hz in the USA) and its harmonics (120 Hz, 180 Hz, etc.) due to the continuous making and breaking of electrical contact by motor bushes of this type of electrical device.

A switched-mode power supply (SMPS) is an electrical power supply unit that incorporates a switching regulator to provide the output voltage required by electrical devices using the SMPS. The function of the SMPS is to provide a regulated output voltage usually at a different level from the input voltage received from the electrical power infrastructure. Electrical devices using SMPS have become increasingly prevalent because of their higher efficiency, smaller size, and lower cost compared to traditional power supplies. Additionally, manufacturers increasingly employ SMPS in their products to meet minimum energy efficiency requirements (e.g., the United States Department of Energy's Energy Star program). For example, most personal computers as well as fluorescent lighting now use SMPS. More than ten years ago, most consumer electronic devices did not employ SMPS because of the immature state of SMPS technology and the absence of low cost, single chip SMPS implementations.

Modern SMPS-based electrical devices generate noise that is synchronous to their power supply's internal oscillator. Additionally, in contrast to traditional linear power regulators, an SMPS does not dissipate excess power as heat, but instead stores energy in an inductor and switches this stored energy in from the electrical power line and out to the load as required, and thus wasting much less energy than traditional electrical power supplies. The key to an SMPS smaller size and efficiency is its use of a power transistor to switch the stored electrical energy at a high frequency, also known as the switching frequency. The switching frequency is usually much higher than the 60 Hz AC line frequency (in the U.S.) because, at higher frequencies, the inductors or transformers required are much smaller. A typical SMPS operates at tens to hundreds of kilohertz (kHz). The switching waveform can be adjusted to match the power requirements of the electrical device that the SMPS is powering. For example, a CFL's power supply employs an SMPS to generate the high voltages necessary to power the CFL. The switching action, which is the cornerstone of an SMPS's operating principle, generates a large amount of EMI centered around the switching frequency.

In some examples, method and system can detect the noise generated by electrical appliances that contain switch mode power supplies. A certain percentage of electrical appliances in a home or other structure, however, do not contain switch mode power supplies and therefore, do not emit any continuous high frequency signatures, which can be detected by the SMPS method(s).

Embodiments described herein can alleviate this problem using a very low cost hardware platform, which can be attached at the AC inlet (plug) of any given appliance. The device can leak a high frequency signal onto the AC line emulating those signals emitted by switch mode power supplies. One embodiment can vary the leaked frequency with a predetermined ratio with the power or load current of the appliance to which the device is coupled. This procedure can allow the device measuring the EMI (electromagnetic interference) on the power line to ascertain the amount of power or current used by the specific appliance coupled to the device. Furthermore, this device can be used as a mechanism to calibrate a contactless current sensor.

This method of signature enhancement is not to be confused with commonly available devices which measure power or current and use two way communication (such as communications using, for example, the Zigbee or X2 standard) to send that information to a display or computing device. Unlike these communication devices, the device described herein is not a communication device and does not send any bits of information. Instead, the device merely enhances the noise signature of an appliance to which it is coupled. This enhancement aids in disaggregation using techniques involving disaggregation via continuous noise (EMI).

In some embodiments, a signal emulation device which when attached to the AC inlet of an appliance leaks a high frequency signature (e.g., 10 kHz to 2 MHz frequency tone) on to the AC line. The high frequency signature does not comprise a communication scheme and is strictly present to emulate the signatures generated within switch mode power supplies for the purpose of aiding any disaggregation methods, which utilize high frequency continuous noise.

In some examples, the tone generated is fixed in frequency and is present when the appliance it is coupled to is drawing above a certain amount of electrical power and absent when the electrical power draw is below this threshold. The tone generated can vary in frequency with direct proportion to the amount of current draw or power draw of the electrical appliance. The signal emulation device can be used with a contactless current sensor for the purpose of calibrating the sensor. The signal emulation device can also be used with any techniques to disaggregate a homeowner's energy bill utilizing EMI and high frequency continuous noise from switch mode power supplies.

Turning to the drawings, FIG. 1 illustrates a block diagram of a signal emulation system 100, according to a first embodiment. Signal emulation system 100 is merely exemplary and is not limited to the embodiments presented herein. Signal emulation system 100 can be employed in many different embodiments or examples not specifically depicted or described herein.

In some embodiments, a signal emulation system 100 can include: (a) signal emulation device 110; and (b) an electrical usage detection device. In some examples, signal emulation device 110 can be an electrical device configured to emulate a high frequency electrical noise signal on an electrical power line. Signal emulation device 110 can include: (a) a monitoring module 120; (b) emitter module 130 coupled to monitoring module 120; (c) electrical coupling mechanism 111 configured to couple to electrical plug 151; (d) electrical coupling mechanism 112 configured to couple to an electrical appliance 155; (e) user input device 113; and (f) user input device 114.

Monitoring module 120 can be configured to detect usage of electrical power from electrical power line 150 by electrical appliance 155. Monitoring module 120 can be further configured to detect an amount of the electrical power used by electrical appliance 155. In some examples, monitoring module 120 can be a mixed signal processor.

Monitoring module 120 can include: (a) a voltage measurement module 122 configured to measure an voltage across electrical appliance 155; (b) a current measurement module 121 configured to measure a current used by the electrical appliance 155; and (c) a power calculation module 123 configured to receive the voltage from voltage measurement module 122 and the current from current measurement module 121 and further configured to determine an amount of the electrical power used by electrical appliance 155. Power calculation module 123 can be further configured to determine the amount of electrical power used at two or more predetermined intervals. That is, power calculation module 123 can recalculate the electrical power used by electrical appliance 155 at predetermined intervals (e.g., 10 ms (millisecond), 100 ms, 500 ms)

Emitter module 130 can be configured to generate an emulated high frequency electrical noise signal. The emulated high frequency electrical noise signal emulates electrical noise from a switch mode power supply.

Emitter module 130 can be further configured to generate the emulated high frequency electrical noise signal when monitoring module 120 detects the usage of the electrical power by electrical appliance 155. Emitter module 130 is further configured to provide the emulated high frequency electrical noise signal to electrical coupling mechanism 111. Electrical coupling mechanism 111 is further configured to place the emulated high frequency electrical noise signal on electrical power line 150 via electrical plug 151.

The frequencies generated by emitter module 130 can primarily be between 300 kHz (kilohertz) and 2 MHz (megahertz) in some examples. This range can be used because most existing devices in a home produce switching frequencies between 10 kHz and 300 kHz and it would be helpful if this device does not to interfere with the sensing of existing switching supplies in a home. Furthermore, standard powerline communication devices usually operate at frequencies above 2 MHz so it would be useful for signal emulation system 100 to operate below 2 MHz. The frequency band between 300 kHz and 2 MHz can be subdivided into two or more channels. In many examples, each signal emulation device can choose one channel of a preset table of channels.

Emitter module 130 can be further configured to generate the emulated high frequency electrical noise signal when monitoring module 120 detects the usage of the electrical power above a predetermined threshold (e.g., 1 watt, 10 watts, and 100 watts) by electrical appliance 155. Emitter module 130 can be further configured to generate the emulated high frequency electrical noise signal with a frequency dependent upon the amount of the electrical power used by electrical appliance 155. In some examples, emitter module 130 can include: (a) an analog filter circuit; and (b) a signal generation module configured to generate the emulated high frequency electrical noise signal.

In various embodiments, emitter module 130 is configured to not emit any emulated high frequency electrical noise signal when electrical appliance 155 is not drawings the electrical power.

Signal emulation system 100 is configured to receive via electrical coupling mechanism 111 the electrical power from electrical plug 151 and provide the electrical power to electrical appliance 155 via electrical coupling mechanism 112.

User input device 113 can be coupled to emitter module 130 and configured to allow a user of signal emulation device 110 to specify a frequency range of the frequency of the emulated high frequency electrical noise signal.

User input device 114 can be coupled to emitter module 130 and configured to allow a user to select whether the frequency of the emulated high frequency electrical noise signal is a fixed frequency or if the frequency of the emulated high frequency electrical noise signal is dependent upon the amount of the electrical power used by electrical appliance 155. That is, emitter module 130 can be configured to work in either CW (continuous wave) mode or variable frequency mode. CW mode emulates the behavior of a fixed frequency switching supply, which emits a fixed frequency tone onto the AC line and turns this tone on/off when the load current draw is greater than some preset threshold.

The variable frequency mode emits a frequency, which is designed to vary within the predetermined channel bandwidth with the frequency proportional to the amount of current or power being consumed by the appliance. The user of signal emulation device 110 can determine if emitter module 130 is going to emit signals in the continuous wave or variable frequency module using user input device 114.

The width of the channel can be determined by the power measurement resolution desired at the EMI sensor, the resolution bandwidth that electrical usage detection device 140 and the number of channels desired. For example, if electrical usage detection device 140 has a sampling rate of 2 MSPS (mega samples per second) and uses an 8192 point FFT (fast Fourier transform), the resolution bandwidth is 244 Hz (hertz). If the desired power measurement resolution is 10 Watts (W) and the typical outlet is rated for a maximum of 120V (volts) and 15 A (amperes) (1800 W), this resolution requires 180 steps for a channel width of 43.92 kHz. Thus, this choice will lead to 15 channels between 300 kHz and 1 MHz and 38 channels between 300 kHz and 2 MHz.

Electrical usage detection device 140 can be configured to monitor general electrical noise transmitted over the electrical power line. PCT Application No. PCT/US11/33992 to Patel et al., and a U.S. Patent Application, titled Systems And Methods For Data Compression And Feature Extraction For The Purpose Of Disaggregating Loads On An Electrical Network, filed Feb. 28, 2012 to Yogeeswaran et al. describe electrical usage noise detection systems, and are incorporated herein by reference.

In the same or different embodiments, the trajectory of each peak is tracked using a peak tracking algorithm. This trajectory of frequency versus time can then be multiplied by the preset conversion factor dP/df (which is the inverse of the change in frequency versus change in power ratio) of the device to give you the power versus time chart of the appliance with which the device is attached to.

Furthermore, electrical usage detection device 140 can be calibrated by switching on a known load on each phase of the structure and then using that known amount of power in an equation to generate a calibration factor. Signal emulation device 110 can be used in place of the calibrator. When the electrical appliance to which signal emulation device 110 is coupled, turns on/off in normal usage, the measured power will calculated using the EMI detection techniques and this can be used as a calibration factor.

FIGS. 2-7 are exemplary schematics for an analog hybrid embodiment of signal emulation device 110. This embodiment uses a rotary switch to select the channel. The embodiment of FIGS. 2-7 also uses an active rectifier circuit along with a shunt resistor to measure the current. The frequency is generated using a V to F chip (in this embodiment it is an AD7740 manufactured by Analog Device, Inc. of Norwood, Mass.). The output of this is fed into a bandpass filter designed to attenuate the 60 Hz of the AC power line by greater than 100 dB (decibels) and also to attenuate the harmonics of the frequency generated by the V to F chip.

FIGS. 8-13 are exemplary schematics for an embodiment of signal emulation device 110 using a microcontroller. That is, FIGS. 8-13 teach an exemplary embodiment that uses a microcontroller with an in built ADC (analog-to-digital converter) module to sample the voltage and current signals (the current is sensed using a shunt resistor). In the microcontroller, the samples from the ADC module are processed using a Fourier transform and the corresponding frequency components for the AC line frequency and its harmonics are extracted and the power can be computed using the following equation:

$$\sum_{k=1}^{\infty} V_k * I_k * \cos(\emptyset_{vk} - \emptyset_{ik})$$

wherein $V_k$ is voltage magnitude at harmonic k, $I_k$ is the current magnitude at harmonic k, $\emptyset_{vk}$ is voltage phase difference at harmonic k, and $\emptyset_{ik}$ is current phase difference at harmonic k. In another example, the electrical power can be calculated by performing a point by point multiplication of voltage and power.

In some examples, there are two buttons on the unit, which can be pressed to increase or decrease the channel respectively. In same or different examples, the device can automatically increase or decrease the channels. In this embodiment, the frequency is generated using a direct digital synthesizer (DDS) and the SPI (serial peripheral interface) bus is used to program the frequency in the DDS. Based on the selected channel and the amount of power sensed, the microcontroller chooses the appropriate frequency and sends this to the DDS.

In some embodiments, the acquisition time to compute the power is a predetermined time (e.g., 100 ms). Based on the power, a frequency is set and it is emitted by the DDS until another, for example, 100 ms has elapsed and a new power reading is computed. If the measured power falls below a preset threshold, the DDS is disabled turning off the frequency generation.

In some embodiments, the presence or removal of an appliance is strictly determined by the addition and removal of a fixed frequency. For use with these types of disaggregation techniques, the device is set to the fixed frequency mode.

Figure 14:
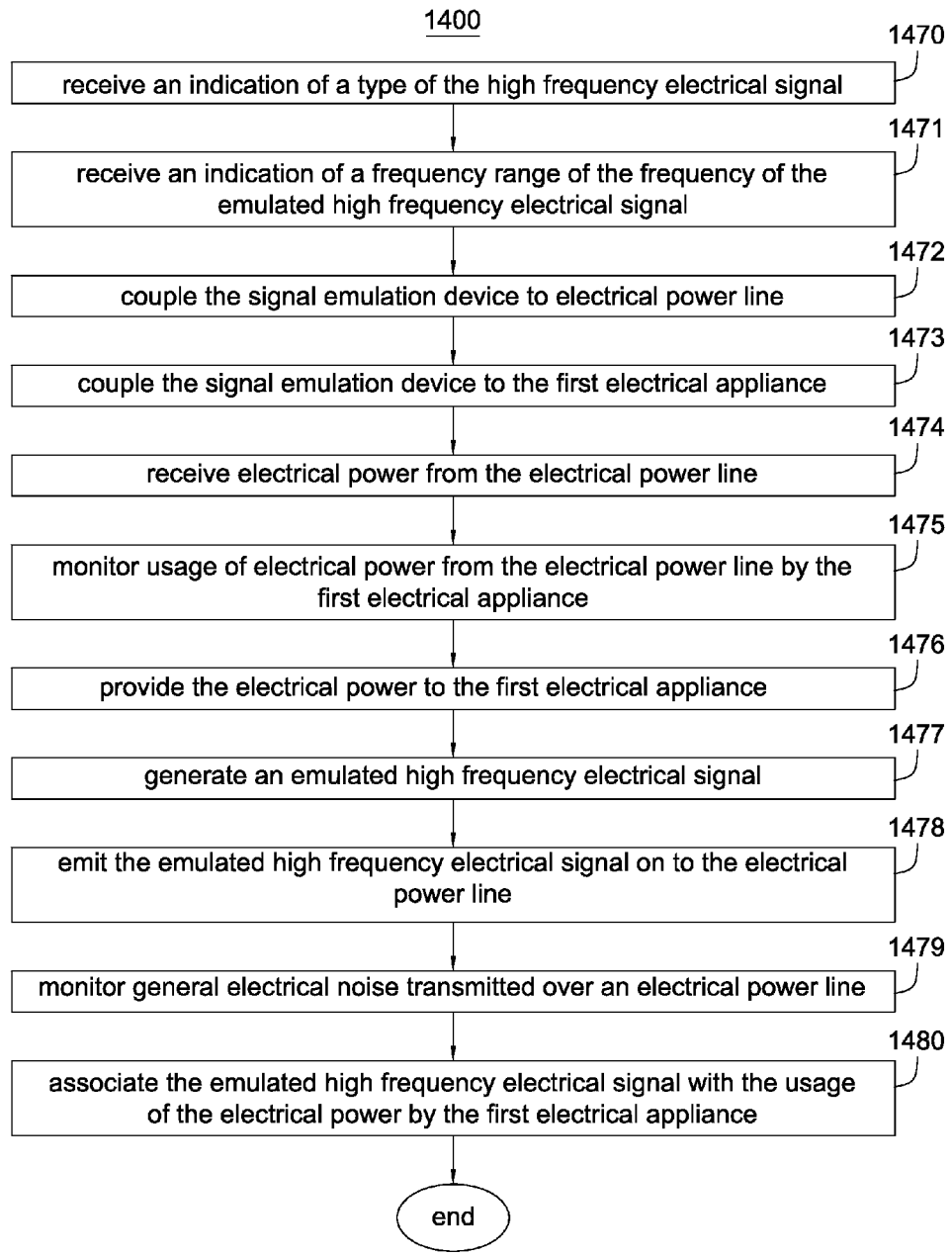
FIG. 14 illustrates a flow chart for an embodiment of a method of emulating a high frequency electrical signature using a first electrical device.

FIG. 14 illustrates a flow chart for an embodiment of a method 1400 of emulating a high frequency electrical signature. Method 1400 is merely exemplary and is not limited to the embodiments presented herein. Method 1400 can be employed in many different embodiments or examples not specifically depicted or described herein. In some embodiments, the activities, the procedures, and/or the processes of method 1400 can be performed in the order presented. In other embodiments, the activities, the procedures, and/or the processes of method 1400 can be performed in any other suitable order. In still other embodiments, one or more of the activities, the procedures, and/or the processes in method 1400 can be combined or skipped.

Referring to FIG. 14, method 1400 includes an activity 1470 of receive an indication of a type of the high frequency electrical noise signal. In some examples, user input device 114 (FIG. 1) can receive the indication the type of the high frequency electrical noise signal from the user. In some examples, the user can indicate if the user wants to use either continuous wave mode or variable frequency mode.

Method 1400 in FIG. 14 continues with an activity 1471 of receiving from a user of the first electrical device an indication of a frequency range of the frequency of the emulated high frequency electrical noise signal. In some examples, user input device 113 (FIG. 1) can receive the indication of a frequency range to use.

Subsequently, method 1400 of FIG. 14 includes an activity 1472 of coupling the signal emulation device to electrical power line. In some examples, electrical coupling mechanism 111 (FIG. 1) can be coupled to electrical plug 151 (FIG. 1) to couple signal emulation device 110 (FIG. 1) to electrical power line 150 (FIG. 1). In many embodiments, electrical coupling mechanism 111 (FIG. 1) can be a male electrical plug.

Next, method 1400 of FIG. 14 includes an activity 1473 of coupling the signal emulation device to the first electrical appliance. In some examples, electrical coupling mechanism 112 (FIG. 1) can be coupled to electrical appliance 155 (FIG. 1). In many embodiments, electrical coupling mechanism 112 (FIG. 1) can be a female electrical plug and electrical appliance 155 (FIG. 1) can include a male electrical plug.

Method 1400 in FIG. 14 continues with an activity 1474 of receiving electrical power from the electrical power line at the electrical coupling mechanism. In some examples, the electrical power received from the electrical power line corresponding to an amount of electrical power being used by electrical appliance 155 (FIG. 1).

Subsequently, method 1400 of FIG. 14 includes an activity 1475 of monitoring usage of electrical power from the electrical power line by the first electrical appliance. In some examples, monitoring module 120 (FIG. 1) can be used to monitor usage of electrical power.

Next, method 1400 of FIG. 14 includes an activity 1476 of provide the electrical power to the first electrical appliance. In some examples, signal emulation device 110 (FIG. 1) can receive the electrical power from electrical power line 150 (FIG. 1) and provide the electrical power to electrical appliance 155 (FIG. 1).

Method 1400 in FIG. 14 continues with an activity 1477 of generating an emulated high frequency electrical noise signal. In some examples, the emulated high frequency electrical noise signal emulates electrical noise from a switch mode power supply. In the same or different embodiments, emitter module 130 (FIG. 1) can generate the emulated high frequency electrical noise signal.

In many examples, generating the emulated high frequency electrical noise signal can include generating the emulated high frequency electrical noise signal with a frequency dependent upon the amount of the electrical power used by the first electrical appliance. In other examples, generating the emulated high frequency electrical noise signal can include generating the emulated high frequency electrical noise signal with a frequency dependent upon the amount of the electrical power used by the first electrical appliance. In still other examples, generating the emulated high frequency electrical noise signal can include generating the emulated high frequency electrical noise signal with a fixed frequency.

Subsequently, method 1400 of FIG. 14 includes an activity 1478 of emitting the emulated high frequency electrical noise signal on to the electrical power line. In some examples, emitter module 130 can emit the emulated high frequency electrical noise signal.

In many examples, emitting the emulated high frequency electrical noise signal on to the electrical power line can include providing the emulated high frequency electrical noise signal to an electrical coupling mechanism and using the electrical coupling mechanism to place the emulated high frequency electrical noise signal on the electrical power line.

Method 1400 in FIG. 14 continues with an activity 1479 of monitoring general electrical noise transmitted over an electrical power line. In some examples, electrical usage detection device 140 can monitor the general electrical noise transmitted over an electrical power line.

Subsequently, method 1400 of FIG. 14 includes an activity 1480 associate the emulated high frequency electrical noise signal with the usage of the electrical power by the first electrical appliance. In some examples, electrical usage detection device 140 can associate the emulated high frequency electrical noise signal with the usage of the electrical power by the first electrical appliance. U.S. application Ser. No. 12/283,869 to Patel et al. and PCT Application In some examples, electrical usage detection device can include a first module to perform activity 1479 and a second module to perform activity 1480.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that activities 1470-1480 may be comprised of many different activities, procedures and be performed by many different modules, in many different orders that any element of FIG. 1 may be modified and that the foregoing discussion of certain of these embodiments does not necessarily represent a complete description of all possible embodiments.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. An electrical device configured to emulate a high frequency electrical noise signal on an electrical power line, the electrical power line coupled to one or more electrical outlets, the electrical device configured to be coupled to one or more electrical appliances, the electrical device comprising:
a monitoring module configured to detect usage of electrical power from the electrical power line by a first one of the one or more electrical appliances;
an emitter module configured to generate an emulated high frequency electrical noise signal, the emulated high frequency electrical noise signal emulates electrical noise from a switch mode power supply;
a first electrical coupling mechanism configured to couple to a first one of the one or more electrical outlets; and
a second electrical coupling mechanism configured to couple to the first one of the one or more electrical appliances,
wherein:
the emitter module is further configured to generate the emulated high frequency electrical noise signal when the monitoring module detects the usage of the electrical power by the first one of the one or more electrical appliances;
the emitter module is further configured to provide the emulated high frequency electrical noise signal to the first electrical coupling mechanism;
the first electrical coupling mechanism is further configured to place the emulated high frequency electrical noise signal on the electrical power line;
the first electrical coupling mechanism is configured to receive the electrical power from the first one of the one or more electrical outlets; and
the second electrical coupling mechanism is configured to provide the electrical power to the first one of the one or more electrical appliances.

2. The electrical device of claim 1, wherein:
the monitoring module is further configured to detect an amount of the electrical power used by the first one of the one or more electrical appliances.

3. The electrical device of claim 2, wherein:
the emitter module is configured to generate the emulated high frequency electrical noise signal with a frequency dependent upon the amount of the electrical power used by the first one of the one or more electrical appliances.

4. The electrical device of claim 3, further comprising:
a first user input device coupled to the emitter module and further configured to allow a user of the electrical device to specify a frequency range of the frequency of the emulated high frequency electrical noise signal.

5. The electrical device of claim 2, further comprising:
a first user input device coupled to the emitter module and further configured to allow a user to select whether a frequency of the emulated high frequency electrical noise signal is a fixed frequency or if the frequency of the emulated high frequency electrical noise signal is dependent upon the amount of the electrical power used by the first one of the one or more electrical appliances.

6. The electrical device of claim 1, wherein:
the emitter module is further configured to generate the emulated high frequency electrical noise signal when the monitoring module detects the usage of the electrical power above a predetermined threshold by the first one of the one or more electrical appliances.

7. The electrical device of claim 1, wherein:
the emulated high frequency electrical noise signal has a frequency in a range of 300 kilohertz to two megahertz.

8. The electrical device of claim 1, wherein:
the emitter module is configured not to emit the emulated high frequency electrical noise signal when the first one of the one or more electrical appliances is not drawing the electrical power.

9. The electrical device of claim 1, wherein:
the monitor module comprises:
a voltage measurement module configured to measure a voltage across the first one of the one or more electrical appliances;
a current measurement module configured to measure a current used by the first one of the one or more electrical appliances; and
a power calculation module configured to receive the voltage from the voltage measurement module and the current from the current measurement module and further configured to determine an amount of the electrical power used by the first one of the one or more electrical appliances.

10. The electrical device of claim 9, wherein:
the power calculation module is further configured to determine the amount of the electrical power used by a first one of the one or more electrical appliances at two or more predetermined intervals.

11. The electrical device of claim 1, wherein:
the emitter module comprises:
an analog filter circuit; and
a signal generation module configured to generate the emulated high frequency electrical noise signal.

12. A method to emulate a high frequency electrical signature using a first electrical device, the first electrical device coupled to an electrical power line and a first electrical appliance, the method comprising:
   receiving electrical power from the electrical power line at a first electrical coupling mechanism, the electrical power received from the electrical power line corresponding to an amount of electrical power being used by the first electrical appliance;
   monitoring usage of the electrical power from the electrical power line by the first electrical appliance;
   generating an emulated high frequency electrical noise signal, the emulated high frequency electrical noise signal emulates electrical noise from a switch mode power supply; and
   emitting the emulated high frequency electrical noise signal on to the electrical power line.

13. The method of claim 12, wherein:
   generating the emulated high frequency electrical noise signal comprises:
      generating the emulated high frequency electrical noise signal with a frequency dependent upon the amount of the electrical power used by the first electrical appliance.

14. The method of claim 13, further comprising:
   receiving from a user of the first electrical device an indication of a frequency range of the frequency of the emulated high frequency electrical noise signal.

15. The method of claim 12, further comprising:
   monitoring general electrical noise transmitted over the electrical power line; and
   using at least one second device to associate the emulated high frequency electrical noise signal with the usage of the electrical power by the first electrical appliance.

16. The method of claim 12, wherein:
   generating the emulated high frequency electrical noise signal comprises:
      generating the emulated high frequency electrical noise signal only when the electrical power is used by the first electrical appliance.

17. The method of claim 12, further comprising:
   providing the emulated high frequency electrical noise signal to the first electrical coupling mechanism,
wherein:
   emitting the emulated high frequency electrical noise signal on to the electrical power line comprises:
      using the first electrical coupling mechanism to place the emulated high frequency electrical noise signal on the electrical power line.

18. The method of claim 12, further comprising:
   providing the electrical power to the first electrical appliance.

19. The method of claim 12, further comprising:
   coupling the first electrical device to the first electrical appliance.

20. A system configured to measure electrical power used by one or more electrical appliances coupled to an electrical power line, the electrical power line coupled to one or more electrical outlets, the system comprising:
   a first electrical device configured to emulate a high frequency electrical noise signal on an electrical power line, the first electrical device configured to couple to one or more electrical appliances, the first electrical device comprising:
      a monitoring module configured to detect usage of electrical power from the electrical power line by a first one of the one or more electrical appliances;
      an emitter module configured to generate an emulated high frequency electrical noise signal, the emulated high frequency electrical noise signal emulates electrical noise from a switch mode power supply;
      a first electrical coupling mechanism configured to couple to a first one of the one or more electrical outlets; and
      a second electrical coupling mechanism configured to couple to the first one of the one or more electrical appliances, and
   an electrical usage detection device configured to monitor general electrical noise transmitted over the electrical power line,
wherein:
   the monitoring module is further configured to detect an amount of the electrical power used by the first one of the one or more electrical appliances;
   the emitter module is configured to generate the emulated high frequency electrical noise signal with a frequency dependent upon the amount of the electrical power used by the first one of the one or more electrical appliances;
   the emitter module is further configured to generate the emulated high frequency electrical noise signal when the monitoring module detects the usage of the electrical power by the first one of the one or more electrical appliances;
   the emitter module is further configured to provide the emulated high frequency electrical noise signal to the first electrical coupling mechanism;
   the first electrical coupling mechanism is further configured to place the emulated high frequency electrical noise signal on the electrical power line;
   the first electrical coupling mechanism is configured to receive the electrical power from the first one of the one or more electrical outlets; and
   the second electrical coupling mechanism is configured to provide the electrical power to the first one of the one or more electrical appliances.

* * * * *

UNITED STATES PATENT AND TRADEMARK OFFICE
CERTIFICATE OF CORRECTION

| | | |
|---|---|---|
| PATENT NO. | : 8,624,424 B2 | Page 1 of 1 |
| APPLICATION NO. | : 13/444531 | |
| DATED | : January 7, 2014 | |
| INVENTOR(S) | : Karthik Yogeeswaran, Charles Gillen-O'Neel and Jeffrey Garb | |

It is certified that error appears in the above-identified patent and that said Letters Patent is hereby corrected as shown below:

Title Page
    Inventors (item 75) - "Jeffery Grab" should read
                   -- Jeffrey Garb --.

Signed and Sealed this
Eighth Day of July, 2014

Michelle K. Lee
*Deputy Director of the United States Patent and Trademark Office*